(12) United States Patent
Anderson et al.

(10) Patent No.: US 6,240,955 B1
(45) Date of Patent: Jun. 5, 2001

(54) LIQUID LEVEL CONTROLLER

(75) Inventors: R. David Anderson; Carl Wayne Winfrey; Randal Alan Winfrey, all of Wichita Falls, TX (US)

(73) Assignee: Anderson Controls, L.C., Wichita Falls, TX (US)

( * ) Notice: Subject to any disclaimer, the term of this patent is extended or adjusted under 35 U.S.C. 154(b) by 0 days.

(21) Appl. No.: 09/448,128

(22) Filed: Nov. 24, 1999

Related U.S. Application Data

(62) Division of application No. 09/010,013, filed on Jan. 21, 1998, now Pat. No. 5,992,448.

(51) Int. Cl.[7] .................................................. F16K 31/34
(52) U.S. Cl. ......................... 137/414; 137/85; 137/269; 137/416; 251/282
(58) Field of Search .................. 137/82, 85, 86, 137/270, 412, 413, 414, 415, 416, 269; 251/25, 28, 45, 46, 282

(56) References Cited

U.S. PATENT DOCUMENTS

| | | | |
|---|---|---|---|
| 2,649,771 | * | 8/1953 | Parks ..................................... 137/413 |
| 2,653,623 | * | 9/1953 | Hippen et al. ......................... 137/413 |
| 2,944,562 | * | 7/1960 | Glasgow et al. ...................... 137/414 |
| 3,052,254 | * | 9/1962 | Parks ..................................... 137/414 |
| 3,078,716 | * | 2/1963 | Winters ................................. 137/413 |
| 3,088,485 | * | 5/1963 | Hanssen ................................ 137/413 |
| 3,120,241 | * | 2/1964 | Parks ..................................... 137/413 |
| 3,128,784 | * | 4/1964 | Parks ..................................... 137/413 |
| 3,840,044 | * | 10/1974 | Harris et al. .......................... 137/413 |
| 4,436,109 | * | 3/1984 | Taylor ................................... 137/413 |
| 4,542,765 | * | 9/1985 | Glasgow et al. ...................... 137/390 |
| 4,543,973 | * | 10/1985 | Ho ........................................ 137/413 |
| 4,700,738 | * | 10/1987 | Frese et al. ........................... 137/412 |

\* cited by examiner

*Primary Examiner*—George L. Walton
(74) *Attorney, Agent, or Firm*—Charles D. Gunter, Jr.

(57) ABSTRACT

A liquid level controller is shown having a housing with a rear wall. A shaft has a first end which extends through the rear wall to a liquid displacement member located within a liquid containing vessel. A second end of the shaft joins a pair of oppositely extending arms. Each of the oppositely extending arms is rotationally mounted on the housing generally parallel to the rear wall in a bearing. Vertical forces responsive to changes in liquid level act on the displacement member and are transmitted as a force tending to rotate the oppositely extending arms. A lever pivotally mounted to the housing is interconnected with a torque bar which, in turn, connects to the oppositely extending arms of the shaft. A valving assembly is engaged by the lever to provide an output for controlling liquid level within the vessel. The valve assembly includes a pneumatic pilot with a contact point which is engageable by a pin carried on the lever. Movement of the torque bar is transmitted through an adjustment member to the lever pin, whereby movement of the lever actuates the pneumatic pilot.

2 Claims, 5 Drawing Sheets

LIQUID LEVEL CONTROLLER

This application is a division, of application Ser. No. 09/010,013, filed Jan. 21, 1998, now U.S. Pat. No. 5,992,448.

BACKGROUND OF THE INVENTION

1. Field of the Invention

The present invention relates generally to fluid level sensing systems and which the level control is accomplished through the use of a float whose motion is transmitted to a pneumatic or electric controller which is connected to a valve and, specifically, to an improved liquid level controller having a pilot valve for sending an output signal pressure to a pneumatically operated process valve for controlling the valve.

2. Description of the Prior Art

The oil and gas, chemical and other industries utilize process valves for the control of process fluids which are operated by means of a pneumatic or electrical control signal. The pneumatic control for such valves typically includes a pilot valve whose function is to send an output signal pressure to the pneumatic controller, which either opens or closes the process valve. In the typical prior art system, the level of liquid in a tank or other container is sensed with a sensing element or float that is in communication with the liquid in the container and which transmits a force or movement to a control device that is situated outside the container. The force or displacement so sensed is a measure of the change in liquid level.

For instance, in the case of an oil and gas separator tank, a liquid level controller is provided which uses a float or displacement type sensor to transmit changes in the liquid level in the tank to a pilot valve outside the vessel. The pilot valve signals a process control or discharge valve in the discharge outlet from the vessel to open or close the discharge valve in response to the liquid level within the vessel.

Supply gas pressure was generally taken from the production gas and routed to the pilot valve. When the liquid level in the vessel is within the desired limit, the supply gas is vented through the pilot valve to the atmosphere. When the liquid level rises sufficiently to change the position of the float, the flapper applies a force to the pilot valve so that the supply gas is diverted within the pilot valve to thereby provide a control signal to the discharge valve which allows liquid to flow from the vessel.

Many of the prior art liquid level controllers require right or left hand mounting which requires that both mountings be available in inventory. Also, their conversion between such mountings requires extensive reworking of the mounting and the components. Liquid level controllers are described as "direct" and "throttling" in operation if an increase in level in the tank results in a proportional increase in outlet pressure from the controller. Controllers were described as "indirect and throttling" in operation if an increase in level within the tank resulted in a proportional decrease in outlet pressure from the controller. Controllers which operated in the "snap-on or snap-off" mode featured a sudden increase in output pressure with level increase in direct mode and a sudden decrease in output pressure with level increase for indirect operating mode.

The prior art devices were difficult to reconfigure for either direct or indirect signal operation and for snap-on and snap-off or throttling mode and lacked a convenient mechanism for varying the sensitivity of the devices. It was often difficult to reach the internal components of such devices for repair and reconfiguration. Conversion of the prior art devices from "snap-on and snap-off" to "throttling" mode of operation generally required disassembly and substitution of alternative parts. Where a supply gas filter was installed, the filter was difficult to access and clean.

An object of the present invention is to provide an improved liquid level controller which can be easily and quickly converted between direct and indirect action and which has a full range of sensitivity adjustment in both settings.

Another object of the invention is to provide a liquid level controller having an improved pneumatic pilot which is simply and easily switchable between a snap-on and snap-off and a throttling type action.

Another object of the invention is to provide an improved liquid level controller which utilizes an easily adjustable spring counterbalance to accept displacement sensors of various configurations.

Another object of the invention is to provide such a liquid level controller having a supply gas filter housing with an improved filter arrangement which facilitates maintenance or replacement of the filter element.

Another object of the present invention is to provide an improved liquid level controller which is simple in design, economical to manufacture and which is dependable in operation.

SUMMARY OF THE INVENTION

An improved liquid level controller is shown which includes a housing having a rear wall. A shaft has a first end which extends through the rear wall of the housing to a liquid displacement member and has a second end which joins a pair of oppositely extending arms. Each of the oppositely extending arms is rotatably mounted on the housing generally parallel to the rear wall by means of a pair of spaced apart bearings. Vertical forces responsive to changes in liquid level act on the displacement member and are transmitted as a force tending to rotate the oppositely extending arms within their respective bearings. A lever is pivotally mounted to the housing. A torque bar is connected to the oppositely extending arms of the shaft. Means are provided for interconnecting the torque bar and the lever for transmitting forces exerted on the shaft to the lever. A valving assembly is also provided which is acted upon by the lever to produce an output signal for controlling a liquid level. The means engaging between the lever and the valving assembly includes an adjustment member which is slidably mounted on the torque bar and engageable with the lever.

Movement of the adjustment member along the torque bar from one end to the opposite end thereof changes the output for controlling liquid level from direct to indirect acting output. The movement of the adjustment member along the torque bar also varies the sensitivity of the output for controlling liquid level.

Preferably, the valving assembly is a pneumatic pilot which includes a pressurized source of supply gas and means for conducting a signal pressure away from the pneumatic pilot as a control signal for controlling liquid level. The pneumatic pilot is mounted on the wall of the housing above the lever and has a contact point which is engageable by a pin carried by the lever. Slight movement of the torque bar is transmitted through the adjustment member to the lever pin, whereby movement of the lever actuates the pneumatic pilot. An output pressure gauge is mounted on the housing on one side of the pneumatic pilot.

A supply pressure gauge is mounted on the housing on an opposite side of the pneumatic pilot and a cylindrical supply filter is located in a filter housing upstream of the supply pressure gauge. The supply filter housing includes an input for supply gas and an output and an internal flow path, flow of supply gas being from the inside of the filter to the outside thereof. A spring is arranged on the housing to counterbalance movement of the torque bar. The spring is preferably mounted for lateral movement toward and away from the housing rear wall to change the moment the spring force exerts counterbalancing the torque of the float arm.

Additional objects, features and advantages will be apparent in the written description which follows.

DETAILED DESCRIPTION OF THE INVENTION

Figure 1:
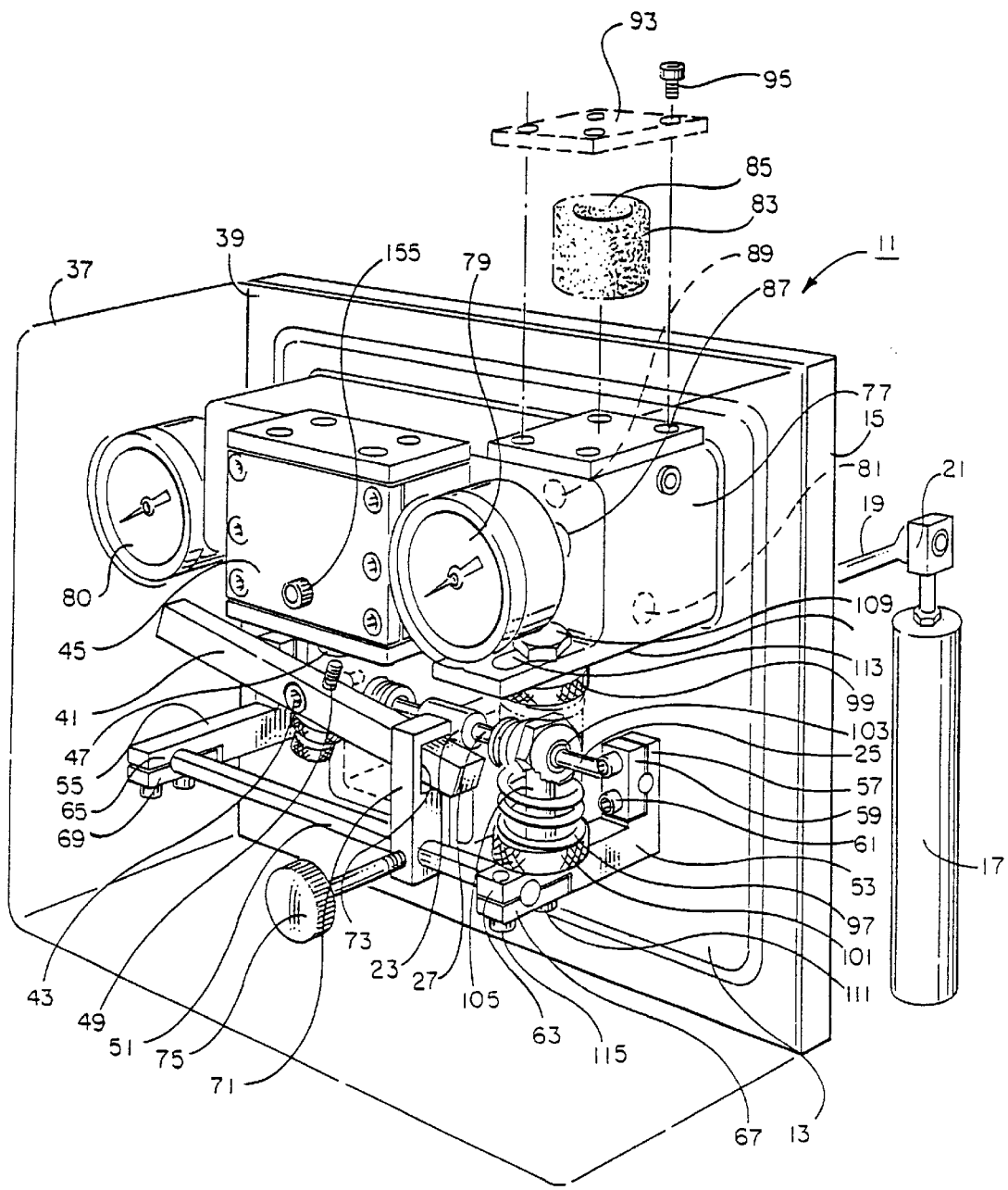
FIG. 1 is a front, perspective view of the level controller of the invention with the front cover removed and the supply gas filter shown in exploded fashion.
Figure 2:
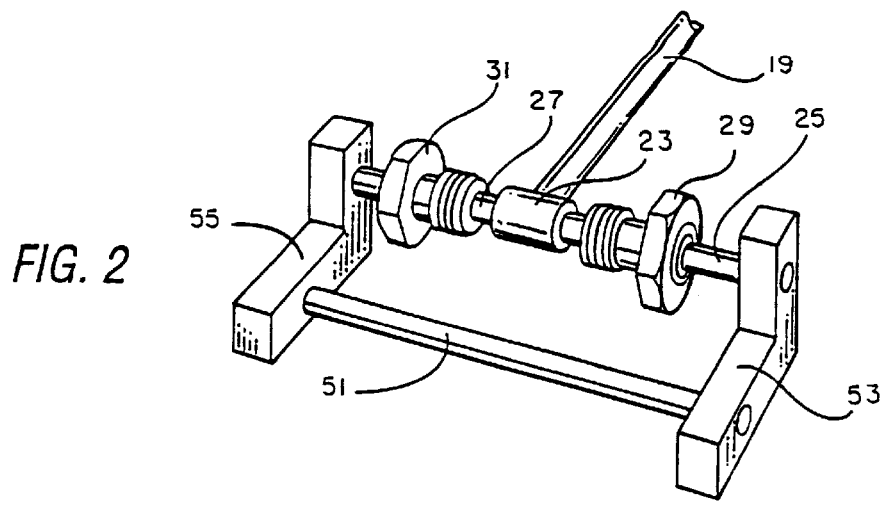
FIG. 2 is an isolated view of the shaft with its oppositely extending arms, bearings and associated torque bar.
Figure 4:
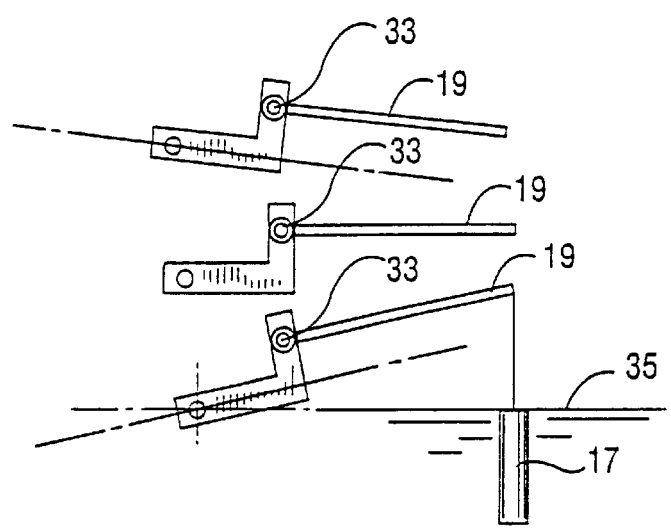
FIG. 4 is a simplified, schematic view illustrating the movement of the shaft, oppositely extending arms and associated torque bar of the device.

FIG. 1 shows a liquid level controller of the invention designated generally as 11. The controller 11 includes a housing 13 having a rear wall 15. The housing rear wall 15 is mountable onto an exterior wall of a liquid containing vessel (not shown), such as an oil and gas separator tank for controlling the liquid level therein. The controller 11 includes a float or displacement element 17 which depends from a shaft 19. The shaft 19 has a first end 21 which extends through the rear wall 15 and through the vessel sidewall to the liquid displacement member 17 and has a second end 23 (FIG. 2) which joins a pair of oppositely extending arms 25, 27. Each of the oppositely extending arms 25, 27 is rotationally mounted on the housing 13 generally parallel to the rear wall 15 by means of a pair of spaced apart bearings 29, 31. Each bearing 29, 31 has an O-ring seal (not shown) which contains pressure so that the vessel can be pressurized. Vertical forces responsive to changes in the liquid level within the vessel act upon the displacement member 17 and are transmitted as a force tending to rotate the oppositely extending arms 25, 27 within the bearings 29, 31. This action is illustrated schematically in FIG. 4 in which the shaft 19 pivots the oppositely extending arms about a point 33 in response to changes in liquid level acting upon the displacement member 17, the liquid level in the vessel being shown at 35 in FIG. 4.

A removable cover 37 (shown in phantom lines in FIG. 1 for ease of illustration) engages the outer edges 39 of the housing rear wall and is connected by any convenient means which allows easy removal of the cover for maintenance, or adjustment operations. The removable cover 37 also provides full side access to the controller.

A lever 41 (FIG. 1) having a generally square cross-section is mounted on the housing 13 for pivotal movement about a pivot point 43. A valving assembly including a pneumatic pilot 45 is mounted on the housing 13 above the lever 41. The pneumatic pilot has a contact point 47 which is engageable by a pin 49 carried by the lever 41. While the invention herein is described with respect to a pneumatic controller, it will be understood by those skilled in the art that the pneumatic pilot 45 could be replaced with either electrical or optic fiber means for controlling the discharge from the vessel in which the liquid level is to be controlled.

A torque bar 51 is connected to the oppositely extending arms 25, 27 of the shaft 19 by means of oppositely arranged side elements 53, 55. In the embodiment of the invention shown in FIG. 1, the oppositely extending arm 25 is retained on a vertical leg portion 57 of the side element 53 by means of a retaining strip 59 and alien screws 61. The torque bar 51 is similarly retained at an outer extent of each of the horizontal legs 63, 65 of the side elements by means of retaining strips 67, 69 and associated allen screws.

A suitable means is provided for interconnecting the torque bar 51 and the lever 41 for transmitting forces exerted on the shaft 19 to the lever 41. Slight movement of the torque bar 51 is transmitted through the engagement means to the lever and lever pin 49, whereby movement of the lever 41 actuates the pneumatic pilot 45.

Figure 3:
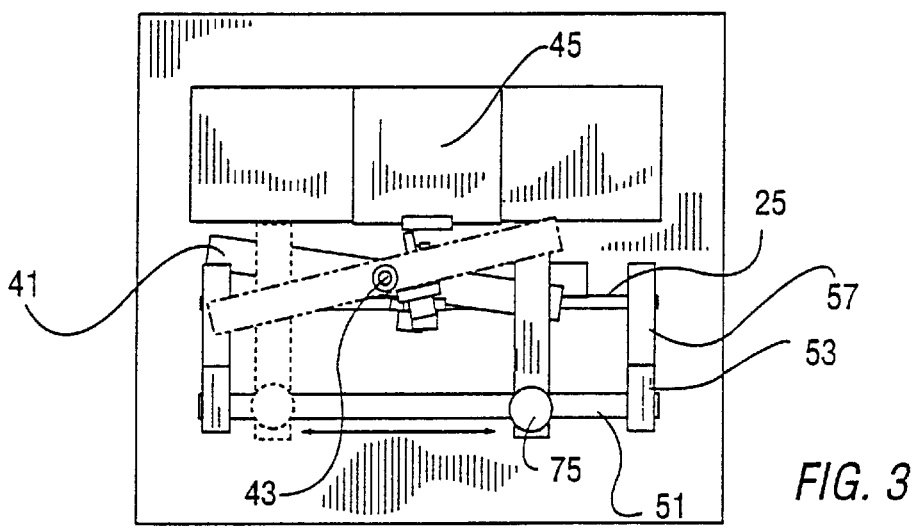
FIG. 3 is a front, schematic view of the movement of the adjustment member which is slidably mounted on the torque bar of the device of FIG. 1.

Preferably, the means engaging between the lever and valving assembly is an adjustment member 71 which, in this case, is a vertical bar having a cut-out 73 for receiving the lever 41 at some point along the length thereof. The adjustment member 71 is slidably positionable along the torque bar 51 by means of the set screw 75. Movement of the adjustment member 71 along the torque bar 51 between the left most position shown in FIG. 3 and the right most position changes the output for controlling liquid level from direct to indirect acting output. Movement of the adjustment member 71 along the torque bar 51 slight distances also varies the sensitivity of the output for controlling liquid level.

The pneumatic pilot 45 is a part of the valving assembly of the liquid level controller which includes a supply of control medium to the housing, an output of control medium from the housing and means for interconnecting and interrupting the flow of control medium from the supply to the output. In the example shown, a filter housing 77 is mounted on the main housing 13 and supports a supply pressure gauge 79. An output pressure gauge 80 is also mounted on the housing. An inlet port 81 communicates with any convenient source of supply pressure. A cylindrical filter element 83 is mounted within the filter housing 77 whereby flow from the inlet port 81 is through the open cylindrical interior 85 of the cylindrical filter element 83 and then outwardly through a pair of output ports. A first output port 87 (FIG. 1) conducts filtered supply gas pressure to the supply pressure gauge 79. Since the filter element 83 is located upstream of the supply pressure gauge 79, a dirty or blocked filter element is easily detected by means of a drop in supply pressure at the gauge 79. A second output port 89 (indicated by dashed lines in FIG. 1) communicates with the pneumatic pilot 45 by means of a supply gas passage 91 (FIG. 5).

The filter element 83, in the embodiment shown, is a 40 micron polyurethane type element approximately one inch in diameter and one inch in length. The filter is conveniently received within the housing 77 by means of lid 93 which is held in place by allen screws 95. Because of the front mounted position of both the filter element 83 and the pneumatic pilot 45, both components of the level controller are easily accessible and are easily removed for maintenance or replacement. Because flow through the filter element 83 is from the inside thereof to the outside, cleaning is facilitated if a replacement filter is not immediately available.

In the prior art devices, changing the float type displacement element 17 or changing the length of the shaft 19 altered the movement arm of the float assembly, generally requiring that a different counterbalance spring 97 (FIG. 1) be employed. In the device of the invention, the spring 97 extends vertically between upper and lower washers 99, 101. A spacer element 103 is received about a portion of the length of the oppositely extending arm 25 and is engaged by a vertical support element 105 for interengaging the arm 25 with the spring assembly. The spring assembly itself is received between the side element 53 and the lower surface 107 by means of the vertical support element 105. In this case, the vertical support element includes an upper extent 109 received within a lateral slot 113 and a downwardly depending lower extent 111. Loosening of the retaining strip 67 by means of its allen screw 115 allows the spring assembly to be moved laterally toward and away from the housing wall 13 in a series of holes (not shown) provided in the side element 53 in order to accommodate for changes in float weights, changes in the length of the shaft 19 or other variances in configuration of the float assembly.

Figure 5:
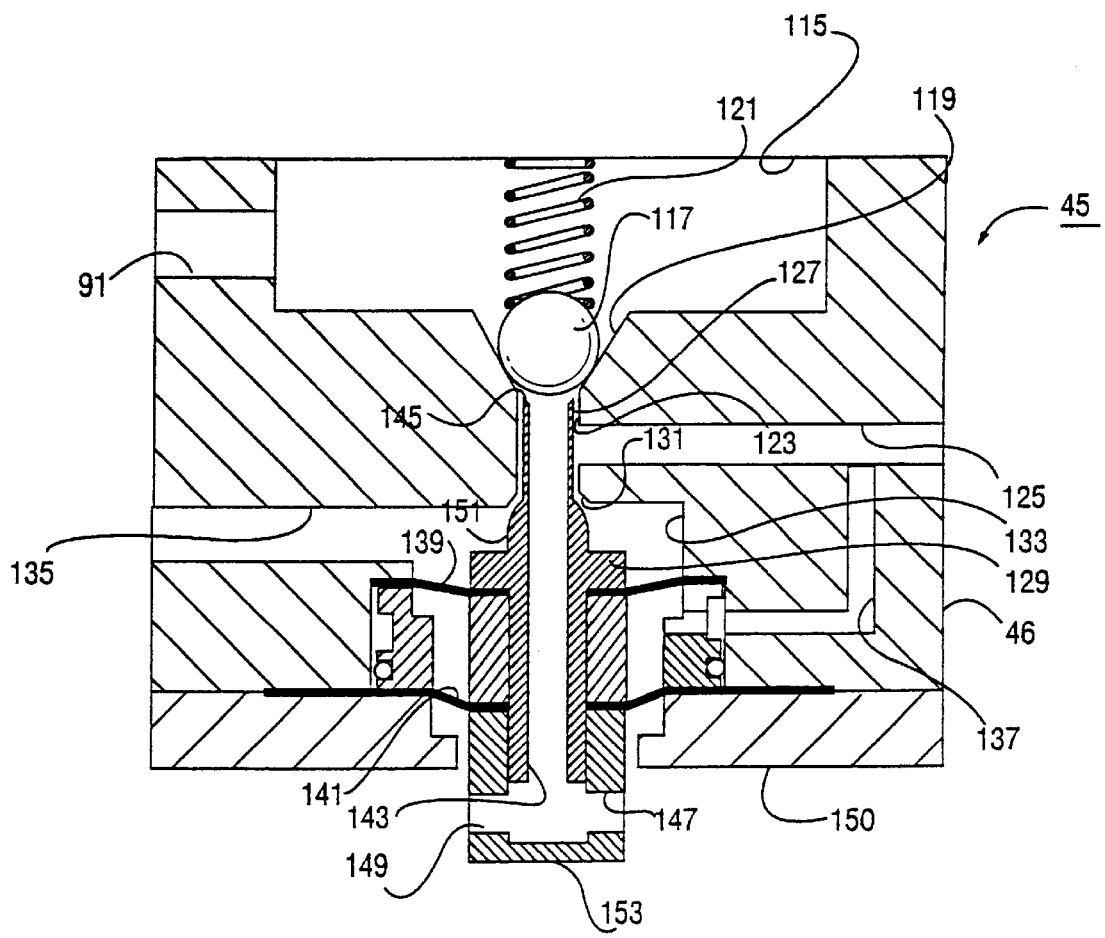
FIG. 5 is a side, cross-sectional view of the improved pilot used with the liquid level controller of FIG. 1, the pilot stem being shown in the fully relaxed position.

As best seen in FIG. 5, the pneumatic pilot 45 comprises a pilot body 46 which includes an upper chamber 115 which communicates with the supply gas passage 91 downstream of the filter element housing 77. The upper chamber 115 includes a ball 117 which is shown resting against a ball seat 119. The ball 117 is biased toward the position shown in FIG. 5 by means of coil spring 121. The ball seat 119 is a conically shaped surface which is connected to vertical passage 123, the vertical passage 123 being intersected by a lateral passage 125. The vertical passage 123 receives the upper neck portion 127 of a pilot stem 129 and includes a tapered seating surface 131 leading to a lower chamber 133. A vent passage 135 extends laterally from the lower chamber 133. A side passage 137 connects the lateral passage 125 with the lower chamber 133.

Figure 9:
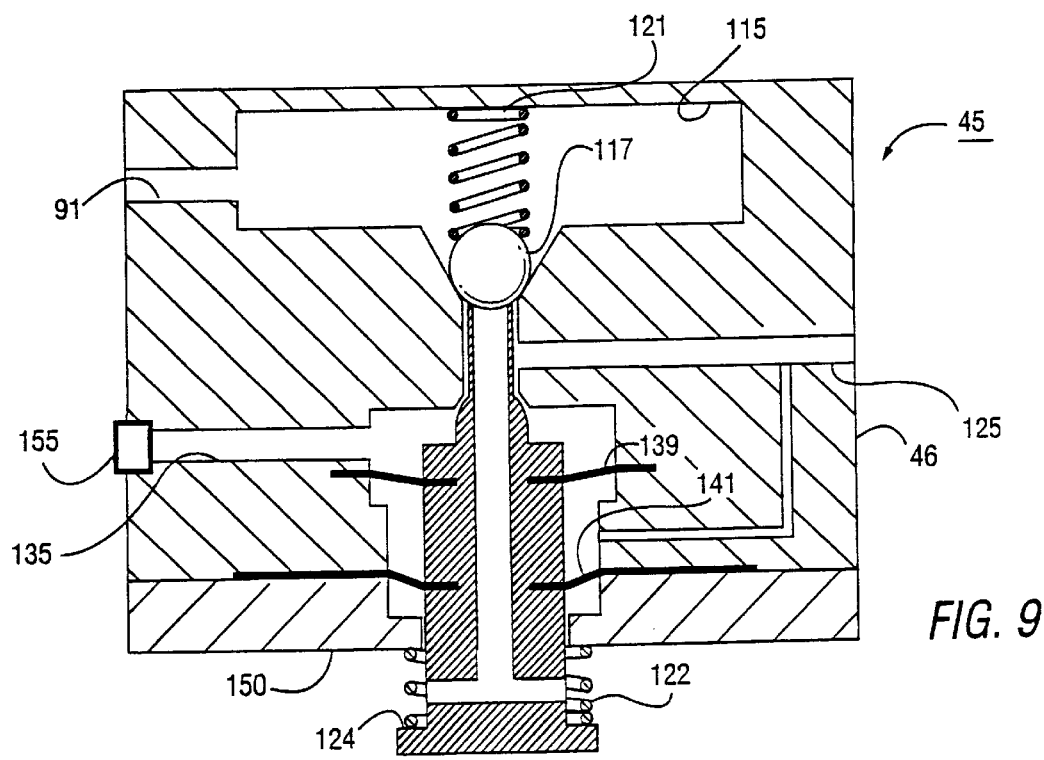
FIG. 9 is a view similar to FIGS. 6–8 but showing an optional pilot stem with an additional biasing spring in place.

The pilot stem 129 is supported within the lower chamber 133 by means of an upper flexible diaphragm 139 and a lower flexible diaphragm 141. The pilot stem 129 also includes a vertical bore 143 which terminates in an upper mouth opening 145 and which communicates at the opposite extent with lower openings 147, 149 which extend in a transverse direction from the vertical bore 143. In some embodiments of the invention, a second coil spring 122 (FIG. 9) may be located about the exposed portion of the pilot stem 129 adjacent the openings 147, 149 above a ledge 124 to bias the stem 129 downwardly with respect to the lower surface 150 of the pilot body 46.

Figure 6:
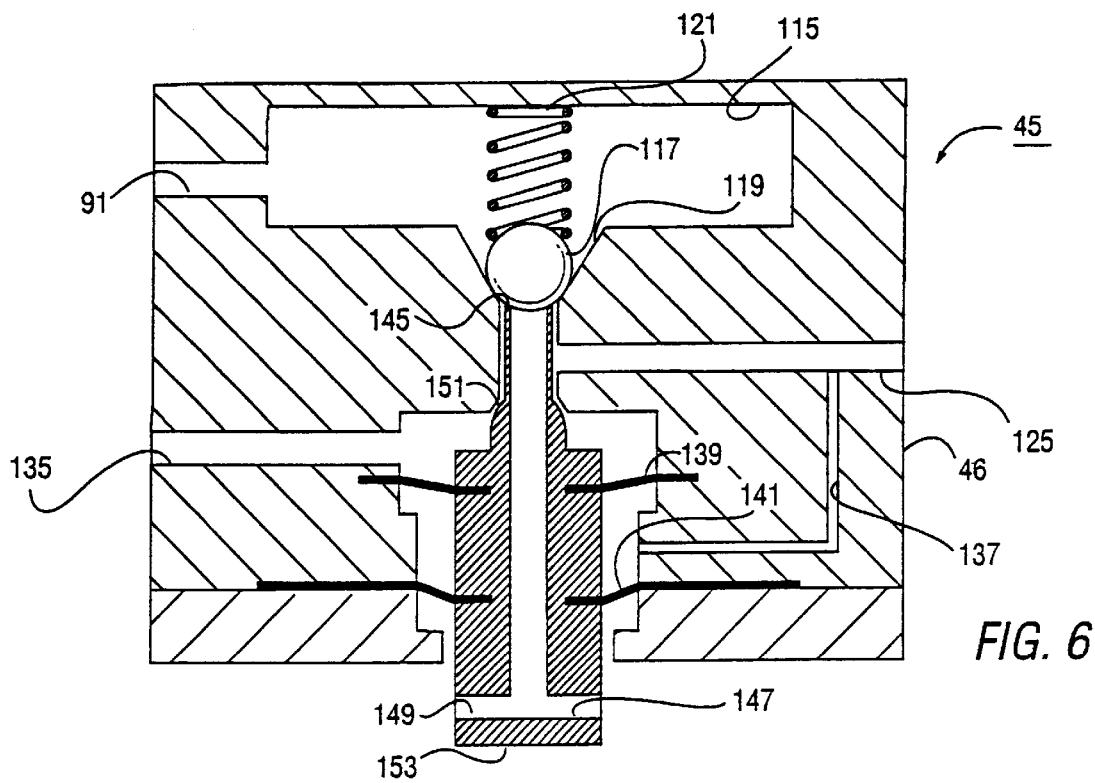
FIGS. 6 and 7 are schematic views, similar to FIG. 5 showing the operation of the pilot in the snapoff and snap-on modes of operation, respectively.
Figure 7:
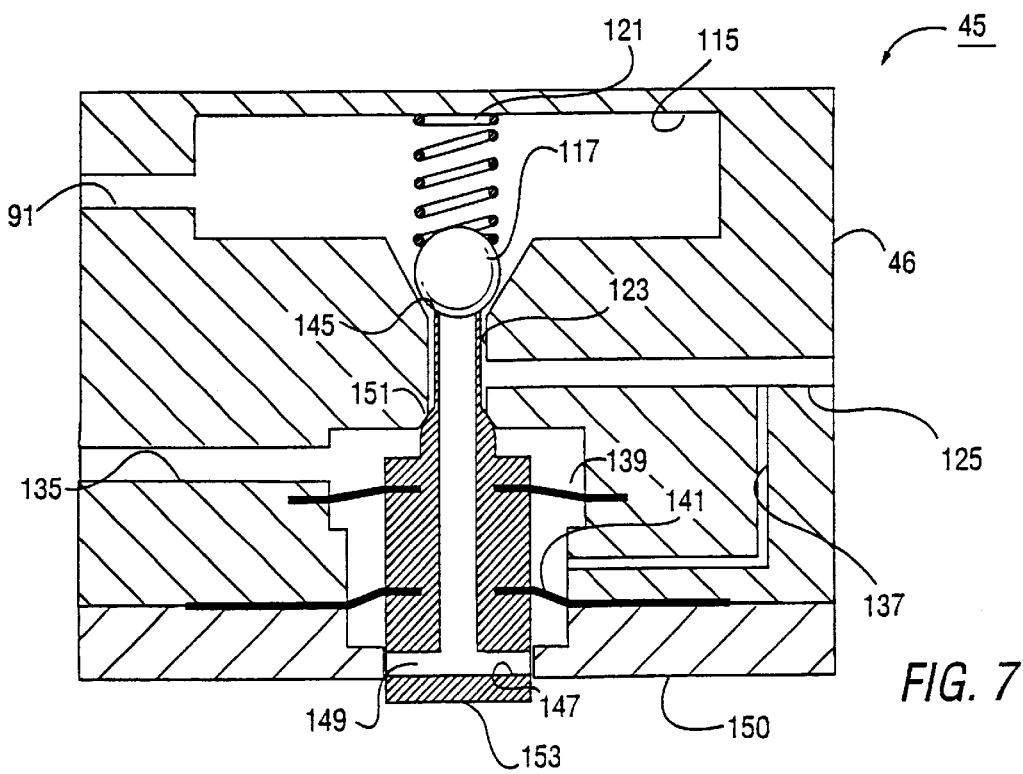
Figure 8:
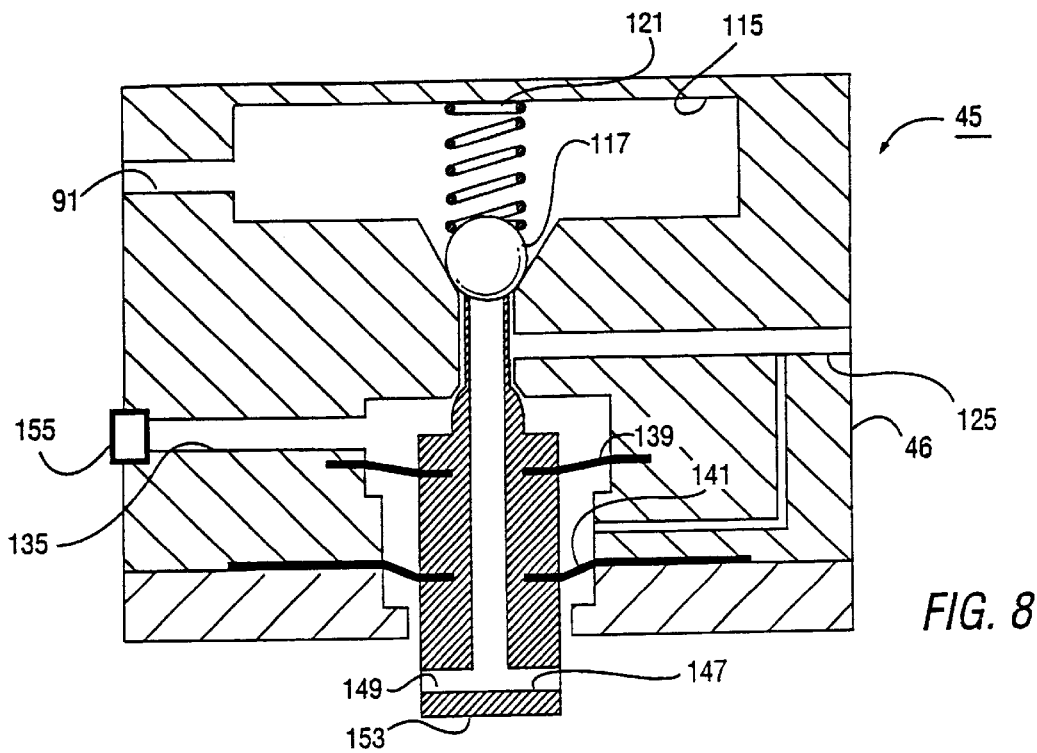
FIG. 8 is a schematic view, similar to FIGS. 6 and 7 but showing the pilot in the throttling mode of operation.

With reference to FIGS. 6-8, the pneumatic pilot 45 is placed in the "snap-acting model" by leaving the vent passage 135 unplugged. When the vent passage 135 is unplugged, diaphragm 139 is activated by means of the gas pressure in passages 135 and 137 and the seat formed between the ball 117 and mouth opening 145 (FIG. 5) of the pilot stem 129 referred to as the "mouth seat" is constantly closed. Note that another seat can be formed between the ball and the seat 119 in certain positions (FIGS. 6 and 7) of the pilot stem referred to as the "ball seat."

In the snap-acting position, the pneumatic pilot uses the ball seat as well as a seat formed between the pilot upper shoulder 151 and the tapered seating surface 131, referred to as the "pilot seat" herein. The pneumatic pilot also uses the forces which act upon both the upper diaphragm 139 and the lower diaphragm 141 due to gas pressure within the passages 135, 137 and the vent openings 147, 149. The mouth seat is constantly closed. The ball seat controls the supply gas entering the pilot through the supply gas passage 91. The pilot seat controls the pilot gas venting to the atmosphere through the vent passage 135 and the openings 147, 149.

As force transmitted from the pin 49 of the lever 41 (FIG. 1) on the pilot stem lower surface 153 (FIG. 7) increases to the point of overcoming the force acting upon the ball seat, the ball seat opens allowing supply gas to enter the pneumatic pilot through the vertical passage 123. Note that the openings 147, 149 are closed to prevent escape of gas. Because the upper diaphragm is of a larger cross-sectional area than the lower diaphragm 141, the pilot pressure instantly pushes the pilot stem upwardly as viewed in FIG. 7 to close the pilot seat and block any pilot gas to vent. As the transmitted force on the pilot stem lower surface 153 decreases, the ball seat closes, the pilot seat opens, the diaphragms are relaxed, thereby allowing the pilot gas to vent (FIG. 6). This movement results in a "snap" action. The snap-off and the snap-on positions of the pilot are illustrated in FIGS. 6 and 7, respectively.

FIG. 8 illustrates a "throttling" mode for the pneumatic pilot 45. In the throttling mode, a pilot vent plug 155 is installed within the vent passage 135. With the plug 155 installed, the lower diaphragm 141 is activated while the upper diaphragm 139 and the pilot seat are disabled. In the throttling mode, the pneumatic pilot utilizes the mouth seat as well as the forces acting on the lower diaphragm 141. As the force transmitted to the lower surface 153 of the pilot stem increases, the mouth seat closes, blocking any pilot gas from venting. A further increase of transmitted force results in the opening of the ball seat, thereby allowing supply gas to enter the pilot.

As the pressure increases in the pneumatic pilot, the lower diaphragm 141 creates a force opposed to the transmitted force on the pilot stem 129 until a balance in forces is achieved. Any decrease of transmitted force closes the ball seat created between the ball 117 and seat 119 and opens the mouth seat created between the ball exterior and the upper mouth opening 145 in the pilot stem 129. This action allows the pilot gas to exhaust through the vertical bore 143 of the pilot body and through the openings 147, 149 until balance is one again achieved. This balance of forces results in the pilot's output being proportional to the transmitted force on the pilot stem, thereby achieving a "throttling" action. The vent plug 155, as shown in FIG. 1, is easily accessible from the front of the level controller allowing simple one-step conversion from snap-acting to throttle-acting control.

An invention has been provided with several advantages. The non-bleeding design of the level controller eliminates the constant venting of supply gas to the atmosphere. By moving the slidable adjustment member along the torque bar, the sensitivity of the unit is adjusted. Moving the adjustment member from the left hand side of the lever to the right hand side changes the operation of the controller from direct to indirect. By moving the adjustment bar away from the pivot point of the lever, sensitivity is increased. Conversely, moving the adjustment bar toward the pivot point decreases the sensitivity of the unit. The removable cover allows the unit to be conveniently accessed for cleaning or repair and allows full side access to the components of the controller. The pneumatic pilot is conveniently located so that it can be easily and quickly removed for servicing. The only tool required for complete access to the pilot or supply gas filter is one allen wrench. The supply gas filter is located under a removable filter cover in a filter housing which is upstream of the supply pressure gauge. This allows the supply pressure gauge to indicate a plugging filter so that the filter can be serviced or replaced. Because of the arrangement of the shaft, opposing side arms and torque bar there is no need for left or right hand installation components as was required in certain of the prior art devices. The balanced, spaced-apart bearings used to mount the opposing side arms of the shaft transmit the displacer force through both sides of a pivoting axle whereby bearing life and sensitivity are increased. By simply adding or removing a set screw plug the action of the controller can be changed from snap-acting to throttling.

While the invention has been shown in only one of its forms, it is not thus limited but is susceptible to various changes and modifications without departing from the spirit thereof.

What is claimed is:

1. A pneumatic pilot assembly, comprising:

a pilot body having an upper chamber, a lower chamber and a supply gas inlet to the upper chamber;

a vertical passage connecting the upper chamber and the lower chamber, the vertical passage having a ball seat at an upper extent thereof which receives a spring biased ball for opening and closing the vertical passage;

a vent passage communicating with the lower chamber;

a lateral passage for communicating pilot gas to both the vertical passage and the lower chamber;

a pilot stem having an upper extent located within the vertical passage and having a lower extent located within the lower chamber, the upper extent having a tapered mouth opening for contacting and seating with the ball located within the upper chamber, an internal bore, and having an external seating surface below the mouth opening for contacting a seat located at the lower extent of the vertical passage;

a pair of vertically spaced diaphragms located within the pilot body for supporting the pilot stem within the pilot body;

wherein the vertically spaced diaphragms comprise an upper diaphragm of a first exposed cross sectional area and a lower diaphragm of a second, relatively lesser exposed cross sectional area;

wherein unplugging the vent passage activates the upper diaphragm and forms a seat between the pilot mouth opening and the ball; and wherein the act of plugging the vent passage activates the lower diaphragm and disables the upper diaphragm by balancing output gas pressure acting on opposite sides of the upper diaphragm.

2. A pneumatic pilot assembly, comprising:

a pilot body having an upper chamber, a lower chamber and a supply gas inlet to the upper chamber;

a source of supply gas;

a vertical passage connecting the upper chamber and the lower chamber, the vertical passage having a ball seat at an upper extent thereof which receives a spring biased ball for opening and closing the vertical passage at the upper extent and having a shoulder seat at a lower extent thereof;

a vent passage communicating with the lower chamber;

a source of pilot gas;

a lateral passage for communicating pilot gas to both the vertical passage and the lower chamber;

a pilot stem having an upper extent located within the vertical passage and having a lower extent located within the lower chamber, the upper extent having a tapered mouth opening for contacting and seating with the ball located within the upper chamber and having an external seating surface below the mouth opening for contacting the shoulder seat at the lower extent of the vertical passage, the pilot stem also having a vertical bore, the vertical bore terminating in a vent passage at a lower extent of the pilot stem;

an upper and lower vertically spaced diaphragm located within the pilot body for supporting the pilot stem within the pilot body, the upper diaphragm having a greater relative cross-sectional exposed area than the lower diaphragm;

wherein unplugging the vent passage activates the upper diaphragm and forms a seat between the pilot mouth opening and the ball; and wherein the act of plugging the vent passage activates the lower diaphragm and disables the upper diaphragm by balancing output gas pressure acting on opposite sides of the upper diaphragm.

* * * * *